US008285056B2

(12) United States Patent
Taguchi et al.

(10) Patent No.: US 8,285,056 B2
(45) Date of Patent: Oct. 9, 2012

(54) METHOD AND APPARATUS FOR COMPUTING DEGREE OF MATCHING

(75) Inventors: Junichi Taguchi, Sagamihara (JP);
Mitsuji Ikeda, Hitachinaka (JP); Osamu Komuro, Hitachinaka (JP); Akiyuki Sugiyama, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 726 days.

(21) Appl. No.: 12/401,848

(22) Filed: Mar. 11, 2009

(65) Prior Publication Data

US 2009/0232405 A1    Sep. 17, 2009

(30) Foreign Application Priority Data

Mar. 13, 2008    (JP) .................................. 2008-064565

(51) Int. Cl.
*G06K 9/46*    (2006.01)
(52) U.S. Cl. ........................ 382/203; 382/209
(58) Field of Classification Search .................... 382/209
See application file for complete search history.

(56) References Cited

U.S. PATENT DOCUMENTS

| 4,501,016 | A  | * | 2/1985  | Persoon et al. ............... 382/272 |
| 5,933,540 | A  | * | 8/1999  | Lakshminarayanan et al. .............................. 382/260 |
| 6,907,144 | B1 | * | 6/2005  | Gindele ......................... 382/275 |
| 7,206,074 | B2 | * | 4/2007  | Fujimoto et al. .............. 356/456 |
| 7,532,762 | B2 | * | 5/2009  | Sekiguchi et al. ............ 382/233 |
| 7,636,478 | B2 | * | 12/2009 | Bryll ............................. 382/209 |
| 7,822,261 | B2 | * | 10/2010 | Moriya et al. ................. 382/147 |
| 2009/0027500 | A1 | * | 1/2009 | Elangovan et al. ........... 348/159 |

FOREIGN PATENT DOCUMENTS

| JP | 63-211474  | 9/1988  |
| JP | 08-181053  | 7/1996  |
| JP | 2001-351102 | 12/2001 |
| JP | 2007-005818 | 1/2007  |

OTHER PUBLICATIONS

Kouichi Sakai "Fundamentals and Applications of Digital Image Treatment by Visual C#.NET & Visual Basic.NET—From Basic Concept to Face Image Recognition", CQ Publishing House, First Edition issued on Sep. 1, 2003, Chapter 5, Section 3, pp. 84-86.

* cited by examiner

*Primary Examiner* — Matthew Bella
*Assistant Examiner* — Dennis Rosario
(74) *Attorney, Agent, or Firm* — Antonelli, Terry, Stout & Kraus, LLP.

(57) ABSTRACT

A matching degree computing apparatus is provided for comparing an input image and an object template image and computing a matching degree between an input image and an object template image based on the compared result. The computing apparatus includes a transforming unit for transforming the input image so as to be matched to the template object region and a computing unit for computing a matching degree between the transformed input image and the template image. The transforming unit provides a shaping unit for shaping a non-background region to the form of the template object region in the object corresponding region of the input image and a processing unit for arranging the non-background region contacting with the template object corresponding region so that the non-background region has no substantial impact on the matching degree in the object non-corresponding region of the input image.

21 Claims, 12 Drawing Sheets

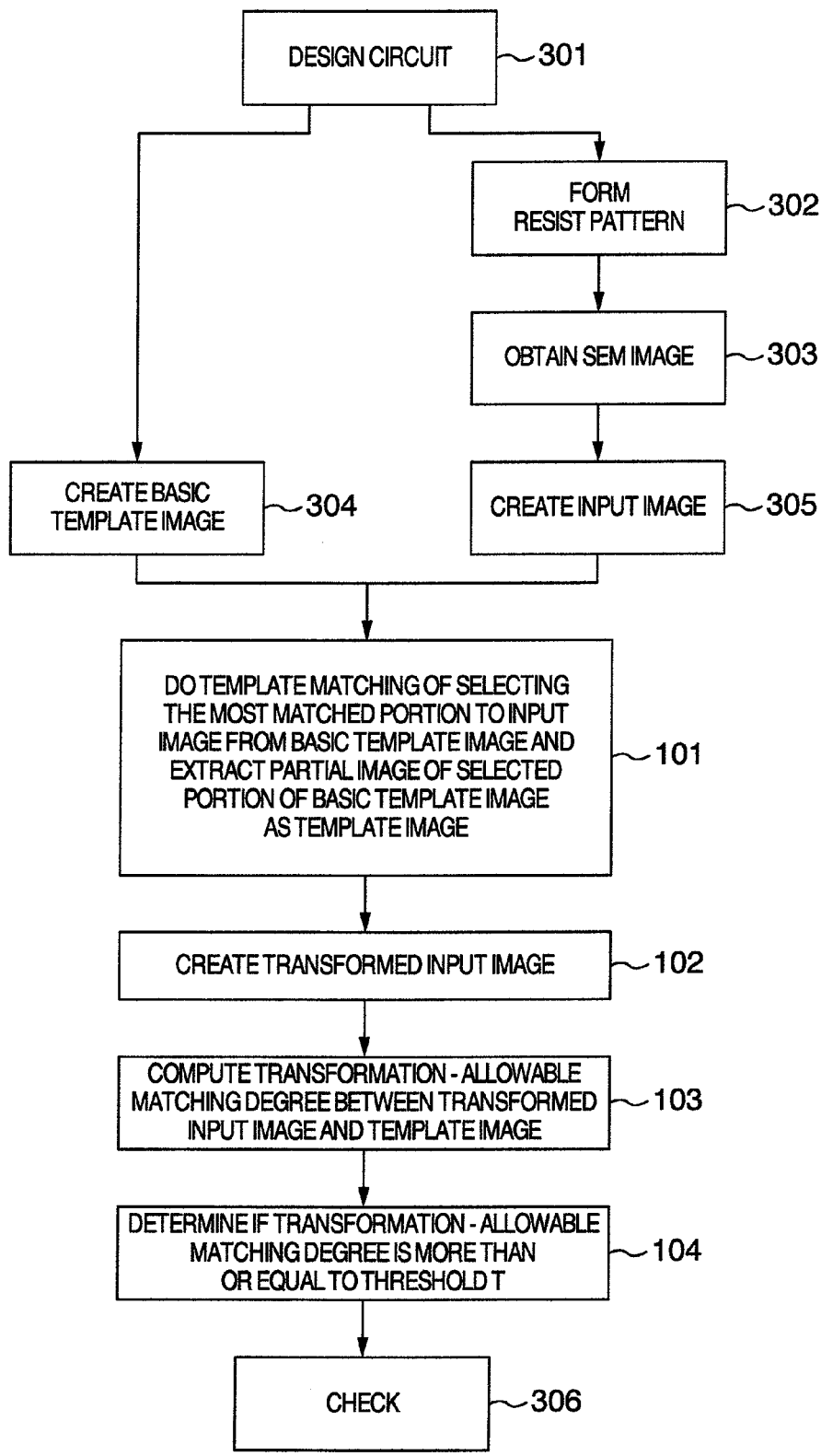

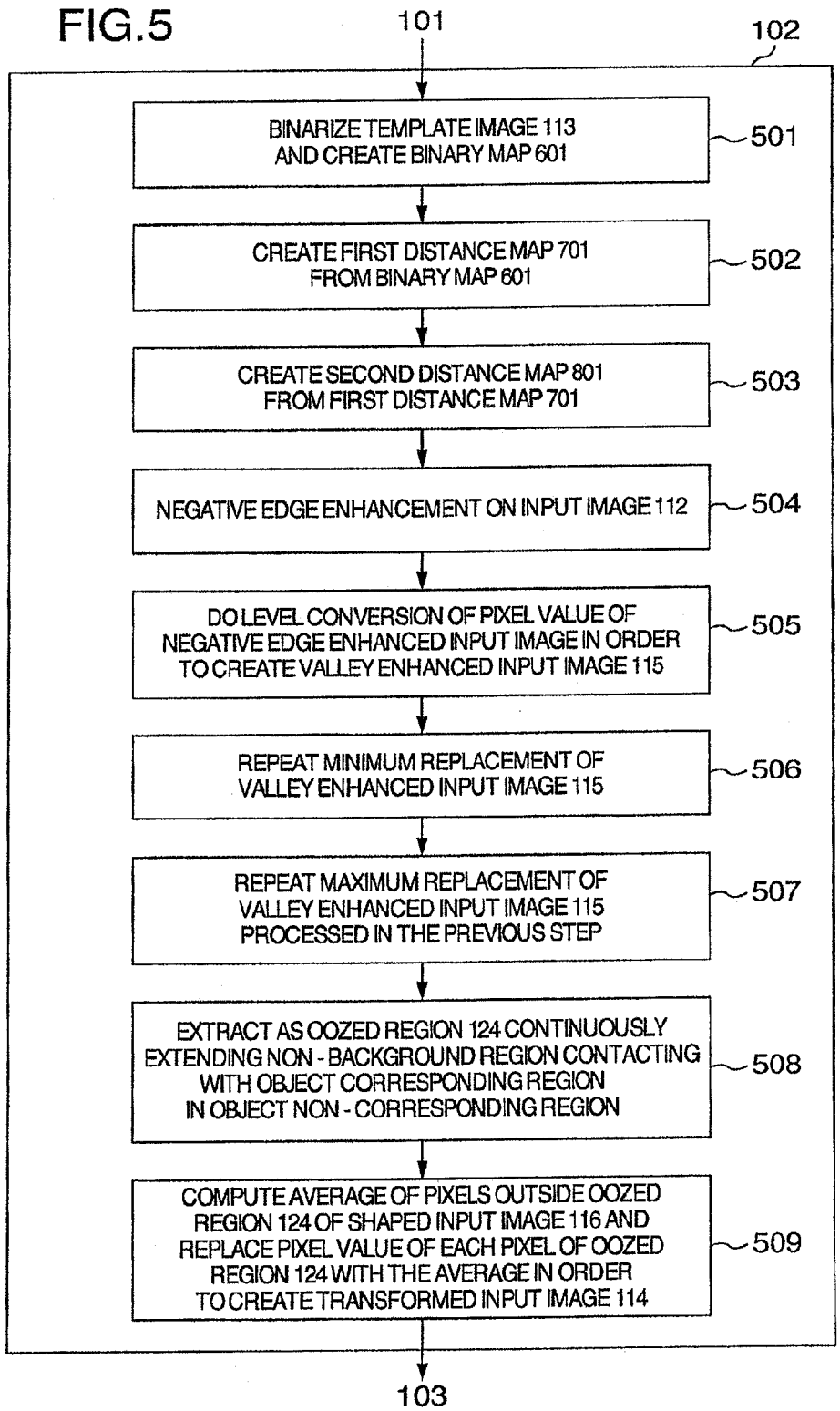

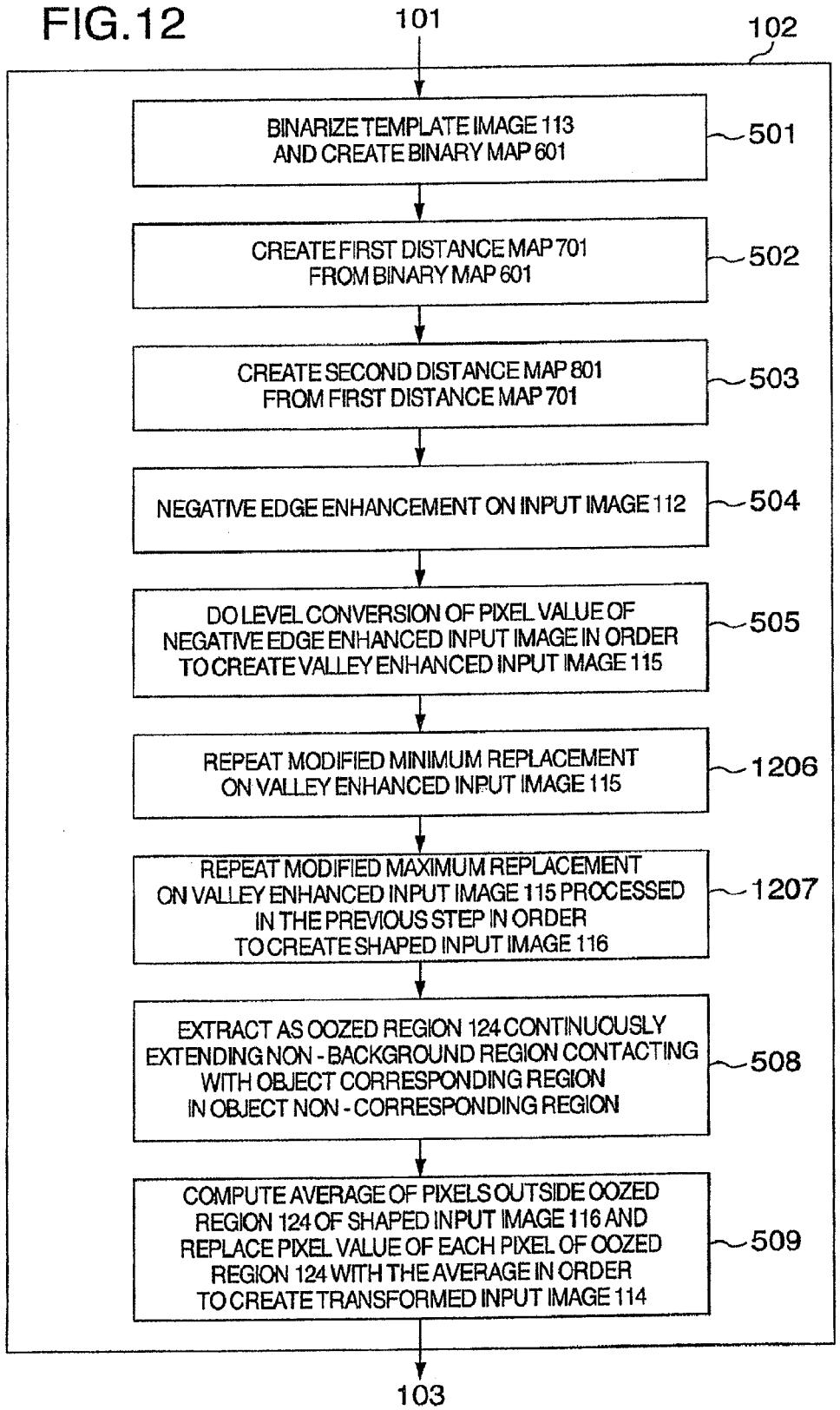

METHOD AND APPARATUS FOR COMPUTING DEGREE OF MATCHING

INCORPORATION BY REFERENCE

The present application claims priority from Japanese application JP2008-064565 filed on Mar. 13, 2008, the content of which is hereby incorporated by reference into this application.

BACKGROUND OF THE INVENTION

The present invention relates to a template matching technique, and more particularly to the template matching technique which is effective especially when a region corresponding with an object of an input image is more transformed as compared with an object region of a template image or when noise is superposed on the input image.

There has been conventionally known the technique called the template matching. This template matching technique is arranged to take the steps of creating a template image from an object image taken by an imaging device, obtaining an evaluated value of matching between an input image and the template image (which value is called a degree of matching or matching degree), and determining if the input image corresponds to the object image or if the object image is included in the input image based on the obtained matching degree.

For example, the basic method of the template matching is described in the publication of "Kouichi SAKAI "Fundamentals and Applications of Digital Image Treatment by Visual C#.NET & Visual Basic.NET—From Basic Concept to Face Image Recognition", CQ Publishing House, First Edition issued on 1 Sep. 2003, Chapter 5, Section 3, pp. 84-86". In FIGS. 5 and 6 shown in this publication, an image of a girl's face is used as an original image. The technique is arranged to take the steps of cutting a portion of a left eye from the image as a template, creating an input image by executing the density conversion of the original image, executing the correlating operations of portions of the input image with respect to the template image, and showing the result. In this example, when a correlation coefficient has a threshold value of 0.99, only the left eye portion cut as the template image corresponds to the matched position, while when the coefficient has a threshold value of 0.8, several matching candidate positions are detected in not only the left eye portion but the portions around the right eye.

As to the template matching technique, there have been several methods for lessening a time of a matching operation. For example, JP-A-63-211474 discloses the technique of hierarchically reducing a size of a template image, a sampling rate and a candidate region for the purpose of enhancing the operating speed more than the template matching to be executed with the template image not to be reduced hierarchically. Further, for example, as to the digital image, the foregoing publication discloses the technique of speeding up the operation time by using a factor of "distance" as an evaluating expression if a subtraction and a normalization based on an average value may be left off. Moreover, for example, if an object to be recognized has a relatively simple form, the Official Gazette of JP-A-2001-351102 discloses the technique of speeding up the matching operation of a digital image by using as a template a circle whose diameter is a width of a circumscribed quadrangle composing the object to be recognized.

The template matching technique is now applied into the wide range of appliances such as various checking devices, a recognizing device, a determining device and a positioning device.

For example, JP-A-8-181053 discloses the positioning method for an exposing device which method is arranged to use the template matching. If a portion of a template image with lots of errors are grasped in advance, the method is executed to take the steps of masking the portion and the region of the imaged image (input image) corresponding with the masked portion of the template image and executing the predetermined evaluating operation with respect to the unmasked region only. This method makes it to possible to exclude the portion with a large error when evaluating the input image, thereby leading to enhancing the positioning accuracy.

Moreover, JP-A-2007-5818 discloses the template matching technique arranged to use the data designed by a CAD (Computer-Aided Design) system when designing a semiconductor. Concretely, the image obtained by imaging the manufactured semiconductor with an electron microscope is used as the input image. Then, the template image is created by taking the steps of creating a bitmap image based on semiconductor design data and smoothing the bitmap image. This template image and the input image are used for the template matching process.

SUMMARY OF THE INVENTION

The conventional template matching technique has been arranged to match the input image to the template image as leaving these images intact. However, this technique is not capable of detecting an object correctly if the region of the input image corresponding with the object is more transformed than the object region of the template image or if noise is superposed on the input image.

For example, in the technique disclosed in Visual C#.Net, if the density conversion of the image results in making the form of a left eye portion of the input image more transformed than the form of a right eye portion of the template image, another region (for example, the right eye portion) may have a higher correlation value than the left eye portion of the input image. Further, for example, if noise is superposed on the input image, the region with lots of noises is likely to have a higher correlation value than any other template image. Also in this case, therefore, another region may have a higher correlation value than the left eye portion of the input image. In these cases, the conventional template matching technique does not provide a capability of detecting a left eye portion correctly.

These shortcomings are made conspicuous when an object is manufactured by micromachining.

In the semiconductor check, for example, if the bitmap image created on the design data is used as the template image as described in JP-A-2007-5818, ordinarily the form of the object region of the template image is far more different than the input image obtained by imaging the actually manufactured object. If the difference of the form of the object region between the template image and the input image becomes large, the evaluated matching value of the object region is made closer to the evaluated matching value of the region outside the object. Hence, it is difficult to set a threshold value to be used for distinguishing both of the images from each other. It means that it is also difficult even to distinguish if the input image corresponds to the target object image or the image of another object erroneously taken by an imaging device.

To overcome the abovementioned shortcoming, the technique disclosed in JP-A-2007-5818 includes the smoothing process for reducing the form difference between the template image and the input image.

However, the smoothing process has difficulty in coping with the form difference of an object brought about by the positional shift between the template image and the input image as keeping the information about the form of the object.

It is therefore an object of the present invention to provide a template matching technique which is arranged to compute a degree of matching on which an object may be detected correctly (it is determined if an object is to be detected) even if the region of the input image corresponding with the object is more transformed than the object region of the template image or even if noise is superposed on the input image.

According to an aspect of the present invention, a matching degree computing apparatus for comparing an input image with a template image of an object and calculating a degree of matching between the input image and the template image based on the compared result, includes transforming means for transforming the input image so that the input image is matched to the object region (template object region) of the template image and computing means for computing a degree of matching between the transformed input image and the template image, the transforming means having object corresponding region processing means for shaping a non-background region to the form of the template object region in the region of the input image corresponding with the template object region and object non-corresponding region processing means for arranging a non-background region (oozed region) contacting with the template object corresponding region in the region of the input image not corresponding with the template object region so that the non-background region has no substantial impact on the degree of matching.

Preferably, the transforming means includes valley enhancing means for enhancing a valley on the change of pixel values of the input image as pre-processing means of the object corresponding region processing means and the object non-corresponding region processing means.

Moreover, preferably, the transforming means includes distance map creating means for creating a distance map for keeping a distance from a boundary of the template object region at each pixel of the template image as the pre-processing stage of the object corresponding region processing means. The object corresponding region processing means includes first means for allocating the distance to each pixel of the object corresponding region of the input image by referring to the distance map and replacing each pixel value of the distance-allocated target pixels with the minimum pixel value of the pixels being located in a predetermined range with the target pixels as a center and having the same allocated distance as the target pixels and second means for replacing each pixel value of the target pixels of the object corresponding region of the input image processed by the first means with the maximum pixel value of the pixels being located a predetermined range with the target pixels as a center and within the object corresponding region. The first and the second means are served to shape the image.

In the above arrangement, preferably, the first means is served to allocate the distance to each pixel of the object non-corresponding region of the input image by referring to the distance map and replace each pixel value of the target pixels having the allocated distances being equal to or less than a threshold value X with the minimum pixel value of the pixels being located in a predetermined range with the target pixels as a center and having the same allocated distance as the target pixels. The second means is served to replace each pixel value of the target pixels being located in the object non-corresponding region of the input image and having the allocated distances being equal to or less than the threshold value X with the minimum pixel value of the pixels being located in a predetermined range with the target pixels as a center and having the allocated distances being equal to or less than the threshold value X.

Preferably, the degree of matching is a normalized correlation value between the transformed input image and the template image. The object non-corresponding region processing means is served to take an average of the pixel values in the region outside the oozed region of the input image and replace each pixel value of the pixels of the oozed region with the obtained average.

More preferably, another means is provided for executing the template matching process for selecting the most matched portion to input image from the basic template image being larger than the input image and extracting the partial image of the portion selected on the basic template image as the template image. Instead, another means is provided for executing the template matching process for selecting the most matched portion to the template image from the basic input image being larger than the template image and extracting the partial image of the selected portion of the basic input image as the input image.

More preferably, the template image is created by using the design image created on the design data for manufacturing an object.

More preferably, the input image and/or the template image are smoothed at a pre-processing stage.

According to another aspect of the present invention, the checking system includes the matching degree computing apparatus according to the above aspect of the invention, means for determining that the input image corresponds to the object image if the matching degree computed by the matching degree computing apparatus is more than or equal to the predetermined threshold value or determining that the input image does not correspond to the object image if the matching degree is less than the predetermined threshold value, and an checking device for checking the input image if it is determined that the input image corresponds to the object image.

According to another aspect of the present invention, the program causes a computer to transform the input image in a manner to be matched to the object region of the template image (template object region). The program causes the computer to execute the transforming process including the object corresponding region processing step of shaping a non-background region to the form of the template object region in the region of the input image corresponding to the template object region (object corresponding region) and the object non-corresponding region processing step of arranging a non-background region (oozed region) contacting with the template object corresponding region so that the oozed region has no substantial impact on the degree of matching in the region of the input image not corresponding with the template object region and the matching degree computing process of computing a degree of matching between the transformed input image and the template image.

Preferably, the transforming process includes a valley enhancing step of enhancing a valley on the change of the pixel values on the input image as a pre-stage of the object corresponding region processing step and the object non-corresponding region process step.

More preferably, the transforming process includes a distance map creating step of creating a distance map for keeping a distance from the boundary of the template object region at each pixel of the template image. The object corresponding region processing step includes a first step of allocating the distance to each pixel of the object corresponding region of the input image by referring to the distance map and replacing each pixel value of the distance-allocated target pixels with the minimum pixel value of the pixels being located in a predetermined range with the target pixels as a center and having the same allocated distance as the target pixels and a second step of replacing each pixel value of the target pixels of the object corresponding region of the input image processed at the first step with the maximum pixel value of the pixels being located in a predetermined range with the target pixels as a center and staying within the object corresponding region.

In this case, preferably, the process of the first step is executed to allocate the distance to each pixel of the object corresponding region of the input image by referring to the distance map and to replace each pixel value of the target pixels having the allocated distances being equal to or less than a threshold value X with the minimum pixel value of the pixels being located in a predetermined range with the target pixels as a center and having the same allocated distances as the target pixels. The process of the second step is executed to replace each pixel value of the target pixels being located in the object non-corresponding region of the input image and having the allocated distances being equal to or less than the threshold value X with the maximum pixel value of the pixels being located in a predetermined range with the target pixels as a center and having the allocated distances being equal to or less than the threshold value X.

Preferably, the degree of matching indicates a normalized correlation value between the transformed input image and the template image. In the object non-corresponding processing step, the process is executed to take an average of the pixel values in the region outside the oozed region of the input image and replace each pixel value of the pixels of the oozed region with the taken average.

Further, preferably, the program causes the computer to execute the template matching process of selecting the most matched portion to the input image from the basic template image being larger than the input image and the process of extracting the partial image of the selected portion of the basic template image as the template image. Moreover, the program causes the computer to execute the template matching process of selecting the most matched portion to the template image from the basic input image being larger the template image and the process of extracting the partial image of the selected portion of the basic input image as the input image.

Moreover, preferably, the program causes the computer to create the template image on the image designed on design data to be used for manufacturing an object.

Moreover, preferably, the program causes the computer to execute the smoothing process with respect to the input image and/or the template image as a pre-processing stage.

According to another aspect of the present invention, the template matching method is executed to compare the input image with the object template image and compute a degree of matching between the input image and the template image. This method includes a step of transforming the input image so that the input image is matched to the object region of the template image (template object region) and a step of computing a degree of matching between the transformed input image and the template image. This transforming step includes an object corresponding region processing step of shaping a non-background region to the form of the object region in the region corresponding with the template object region of the input image (object corresponding region) and an object non-corresponding region processing step of arranging a non-background region (oozed region) contacting with the object corresponding region so that the oozed region has no substantial impact on the degree of matching in the region not corresponding with the template object region of the input image.

The method according to the present invention may be executed by a computer (that is, an information processing apparatus). The whole or part of the program therefore may be installed or loaded through various kinds of medium including as an optical disk, a magneto-optical disk, a magnetic disk, a semiconductor memory and a communication network.

In addition, throughout the specification of the invention, the term "means" indicates not only a physical means but also one or more functions of the "means" implemented by software. Further, one function possessed in one means or device may be implemented by two or more physical means or devices and functions possessed in two or more means or devices may be implemented by one physical means or device.

As mentioned above, the present invention provides a capability of computing a degree of matching on which an object can be detected correctly (it is determined if an object is to be detected) if the object region of the input image is more transformed than the object region of the template image or if noise is superposed on the input image.

These and other features, objects and advantages of the present invention will become more apparent from the following description when taken in conjunction with the accompanying drawings wherein:

BRIEF DESCRIPTION OF THE DRAWINGS

FIG. 3 is a flowchart showing an overall process of the first embodiment;

FIG. 5 is a flowchart showing a content of process of a step 102 included in the first embodiment in detail;

FIG. 7 is a model view showing a first distance map 701;

FIG. 8 is a model view showing a second distance map 801;

FIG. 12 is a flowchart showing a content of process of a step 102 included in a second embodiment in detail.

DESCRIPTION OF THE EMBODIMENTS (1) First Embodiment (1.1) Configuration

Figure 1A:
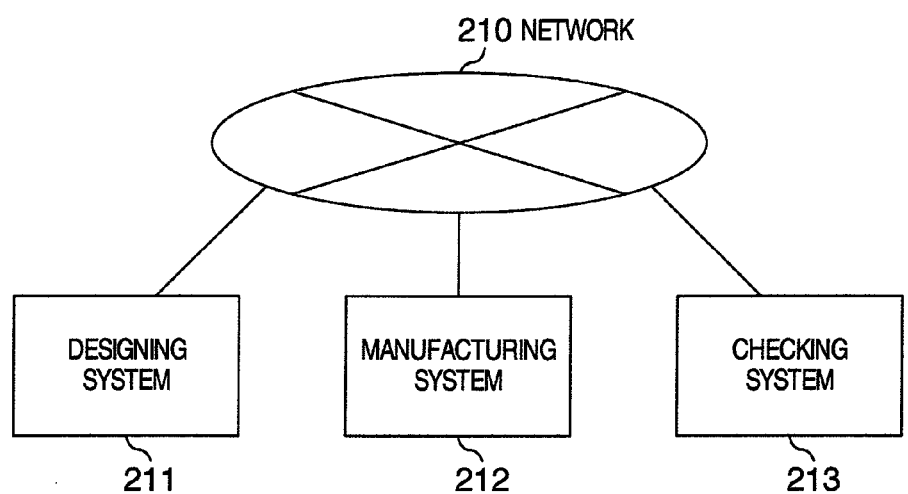
FIGS. 1A and 1B are diagrams showing configurations of an overall system and a checking system according to a first embodiment of the present invention.
Figure 1B:
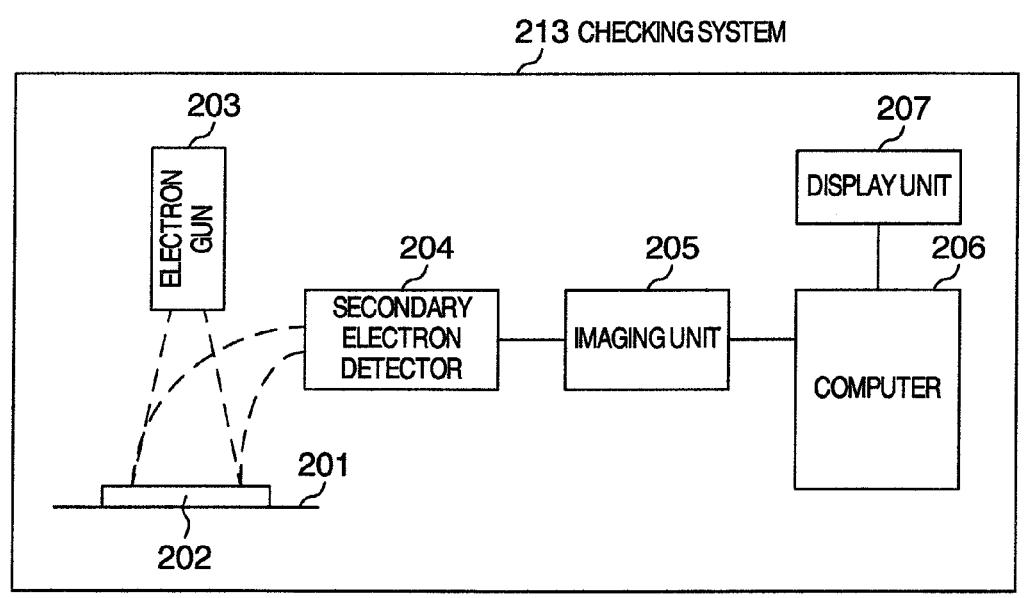

FIGS. 1A and 1B show the overall system according to the first embodiment of the present invention and a checking system included in the overall system. Hereafter, the configurations of the overall system and the checking system will be described.

A designing system 211 operates to design a semiconductor circuit through the use of a CAD (Computer-Aided Design) system and create various kinds of design data such as mask data of a lithography device to be used for manufacturing a semiconductor circuit.

A manufacturing system 212 operates to receive design data of each manufacturing device created by the designing system 212 through a network 210. The design data is passed to each manufacturing device included in the manufacturing system 212. Each manufacturing device manufactures a semiconductor circuit based on the design data on a flow line. In order to form a resist pattern (circuit pattern) on a semiconductor substrate, a lithography device, which is one of the manufacturing devices, operates to apply a mask, which is created on the mask data created in the designing system 211, on a semiconductor substrate, photo-sensitize resist coated on the semiconductor substrate as a circuit pattern by means of a light lithography, and remove the photo-sensitized portion from the semiconductor substrate.

The semiconductor circuit manufactured or being manufactured by the manufacturing system 212 is conveyed to a checking system 213. The checking system 213 operates to perform predetermined checking operations through various kinds of checking devices included in the system 213. Depending upon the checked result, the checked semiconductor circuit is broken or passed to a re-manufacturing process.

For example, the semiconductor substrate on which a resist pattern is formed is imaged for checking by a scanning electron microscope included in the checking system 213. Concretely, the semiconductor substrate 202 with a resist pattern formed thereon is placed on a stage 201 as an object to be checked and then is conveyed to an imaging position. At the imaging position, an electron gun 203 is operated to fire electrons in order to scan the object 202. A secondary electron detecting unit 204 captures secondary electrons reflected on the object 202 and then outputs the secondary electrons to an imaging unit 205. In this unit 205, an image of the object 202 is created.

A computer 206 accepts the image data of the object 202 created by the imaging unit 205 and the design data designed by the designing system 211, executes the predetermined image processing with respect to the image data, and then display the processed data on a display unit 207. The computer 206 may be built in the scanning electron microscope or mounted outside.

Figure 2A:
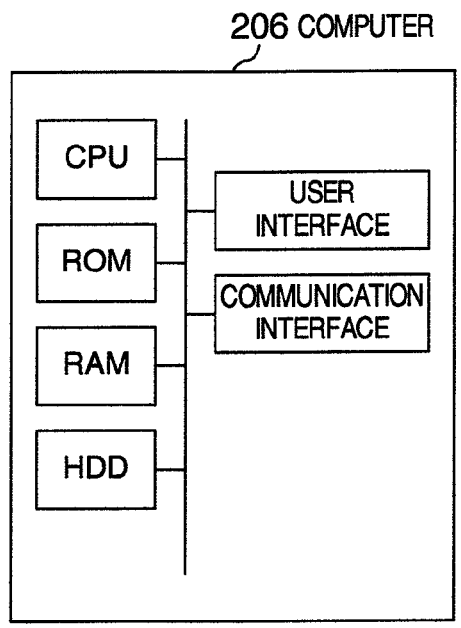
FIGS. 2A and 2B are block diagrams showing a hardware arrangement of a computer 206 and a function arrangement of a matching degree computing apparatus realized by the computer 206.

FIG. 2A is a block diagram showing a hardware arrangement of the computer 206. As shown in FIG. 2A, the computer 206 is arranged to have a CPU, a ROM, a RAM, a HDD, a user interface, a communication interface, and so forth. This hardware arrangement is the same as that of an ordinary computer. Physically, the computer 206 may be a dedicated system or a general-purpose information processing apparatus. The execution of the program for executing all processes of the method of computing a degree of matching according to this embodiment corresponds to implementing a matching degree computing apparatus.

Figure 2B:
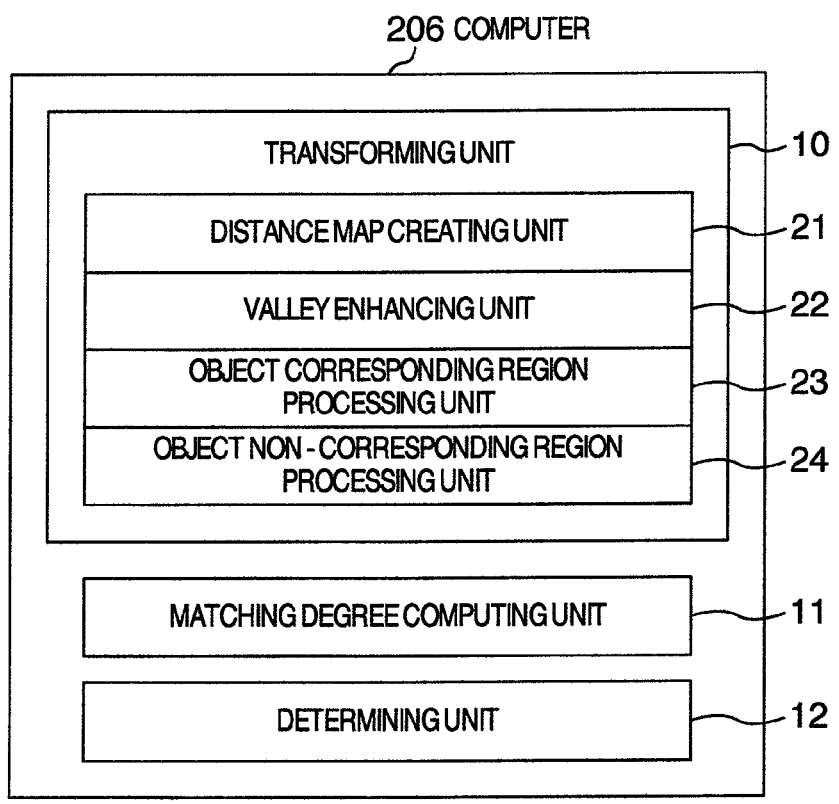

As shown in FIG. 2B, the matching degree computing apparatus realized by the computer 206 includes a transforming unit 10 for transforming an input image to the form of an object region of a template image, a matching degree computing unit 11 for computing a degree of matching between the transformed input image and the template image, and a determining unit 12 for determining that the input image corresponds to an image of an object to be checked if the computed degree of matching is more than or equal to a predetermined threshold value.

The transforming unit 12 includes a distance map creating unit 21, a valley enhancing unit 22, an object corresponding region processing unit 23 and an object non-corresponding region processing unit 24 as main components.

Those components are realized functionally by a program executed under the control of the CPU. The program is stored in the RAM and the ROM of the computer 206 and an outside storage medium.

(1.2) Summary of Overall Process

FIG. 3 is a flowchart showing the overall process to be executed in the first embodiment of the invention. Hereafter, the overall process will be described with reference to FIG. 3.

Step 301: The designing system 211 designs a semiconductor circuit through the use of the CAD and creates various kinds of design data. The design data include data about mask designs to be used for the lithography device of the manufacturing system 302.

Step 302: The manufacturing system 212 makes a mask based on the design data created in the step 301, mounts the mask onto the lithography device, photo-sensitize a resist coated on the surface of the semiconductor through the light lithography, removes the photo-sensitized portion from the semiconductor, and forms a resist pattern (circuit pattern) on the semiconductor substrate.

Step 303: The checking system 213 takes an image of the semiconductor substrate on which the resist pattern created in the step 302 is coated by means of a scanning electron microscope and obtains an image of the surface of the semiconductor substrate.

Step 304: The computer 206 receives the design data created in the step 301 through the network 210, forms a design image of an object to be checked (herein, the resist pattern) based on the design data, and applies a smoothing process to the design image as a pre-process of a matching operation so as to create a basic template image 111.

Step 305: The computer 206 applies a smoothing process to the image taken in the step 203 as a per-process of the matching operation so as to create the input image 112.

A size of a filter to be used for the smoothing process in the step 304 and a size of a filter to be used for the smoothing process in the step 305 are adjusted in advance so that the form of the object to be checked in the basic template image 111 is closer to the form of the object to be checked in the input image 112 as much as possible.

Steps 101 to 104: The computer 206 performs the process of matching the input image 112 to the basic template image 111.

In the first embodiment, hereafter, the size of the basic template image 111 is larger than the size of the input image 112. Further, the normalized correlation value is used as an evaluated value of matching.

In the step 101, the template matching process is executed. In this process, the most matched portion to the input image is selected from the basic template image 111. Then, the partial image of the selected portion of the basic template image 111 is extracted as a template image 113. Concretely, the partial image sized similarly with the input image 112 is cut out of the basic template image 111 and the normalized correlation value is computed between the cut image and the input image 112. The normalized correlation value is obtained by using the expression (5.17) described in page 84 of the foregoing nonpatent literature. The computation of the normalized correlation value is repetitively carried out as shifting the cutting position of the partial image and a group of obtained normalized correlation values is obtained. Then, the partial image with the highest correlation value (the most matched partial image to the input image 112) is made to be a template image 113.

In the step 102, to match the input image 112 to an object region of the template image 113 neatly, the transforming unit 10 transforms the input image 112 to the object region thereof and creates the transformed input image 114. The process of the transforming unit 10 will be described later with reference to FIGS. 5 to 11.

In the step 103, the matching degree computing unit 11 computes a transformation-allowable matching degree between the transformed input image 114 and the template image 113. As the transformation-allowable matching degree, the normalized correlation values of both images may be used.

In the step 104, the determining unit 12 determines if the transformation-allowable matching degree computed in the step 103 is more than or equal to a predetermined threshold value T. If it is, the determining unit 12 determines that the input image 112 corresponds to the image of the object to be checked. On the other hand, if it is not, the determining unit 12 determines that the input image 112 does not correspond to the image of the object to be checked (that is, the input image 112 is not fitted to the checking operation). The determined result is displayed on the display unit 207. In the latter case, the process may go back to the step 303 from which a check for a next object may be started.

Figure 13:
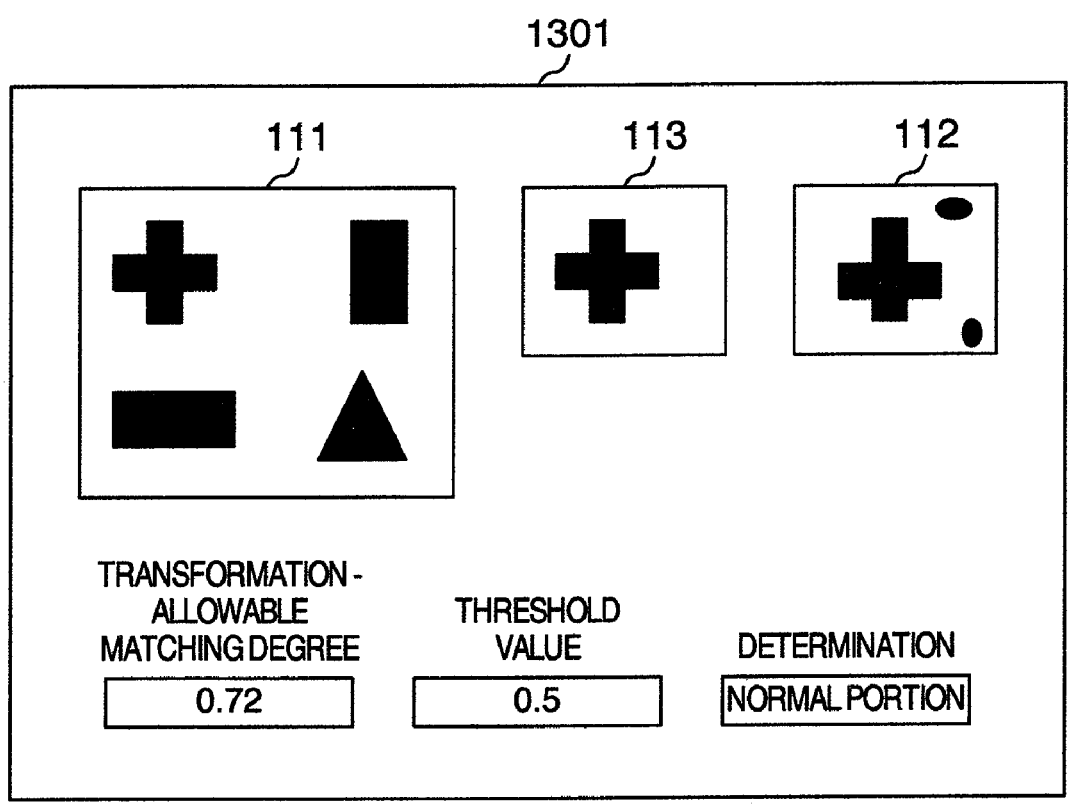
FIG. 13 is a view showing an exemplary display 1301 appearing on a display unit 207.

FIG. 13 shows an exemplary display appearing on the display unit 207. In this example, the ongoing operation of the template matching process or the matching degree computing process is shown on the display unit 207 so that an operator can monitor the contents of the process, whether or not the input image 112 is fitted to the checking operation.

In the upper left stage of the display 1301 is shown the basic template image 111. In the upper right stage of the display 1301 is shown the input image 112. In the upper middle stage thereof is shown the template image 113. Further, in the lower stage of the display 1301 are shown the transformation-allowable matching degree computed in the step 103, the threshold value T used in the step 104, and the determined result derived in the step 104, which are ranged on paper in sequence from left to right. As to the determined result, if it is determined that the input image 112 corresponds to the object to be checked, the determined result indicates the "normal portion", while if it is not, the determined result indicates the "out of the range". Further, the GUI (Graphic User Interface) may be arranged on the screen 1301 so that an operator can change the threshold value T.

Step 306: If it is determined that the input image 112 corresponds to the image of the object to be checked, the computer 206 checks the object on the input image 112. (That is, the computer 206 is served as a checking device.) The checking matters including a check for short-circuiting, a check for a spacing between wires, and so forth, which have been conventionally checked. These checking matters may be executed by the prior art such as application of various image treatments to the input image 112.

(1.3) Comparison with the Prior Art

Figure 4:
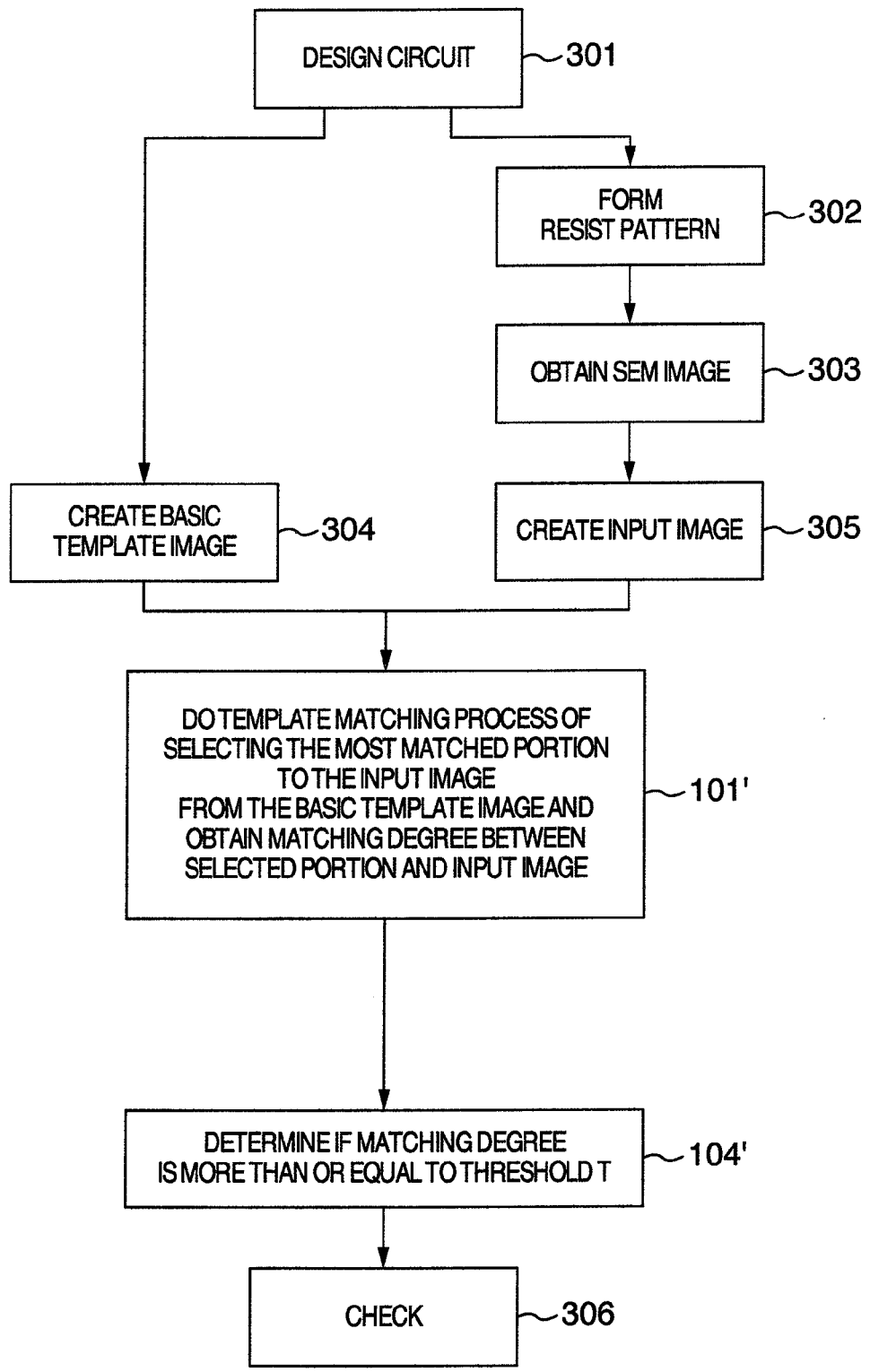
FIG. 4 is a flowchart showing an overall process of a prior art.

FIG. 4 is a flowchart showing the overall process of the prior art. Hereafter, the difference between the first embodiment and the prior art will be described with reference FIGS. 3 and 4.

The flow of process of the prior art shown in FIG. 4 does not include the processes of the steps 102 and 103 as compared with the flow of process shown in FIG. 3.

Further, the process of the step 104 of the first embodiment concerns with the determination on the transformation-allowable matching degree between the transformed input image 114 and the template image 113, while the process of the step 104' of the prior art concerns with the determination on the degree of matching between the input image 112 and the partial image of the basic template image 111.

If the region of the object to be checked of the input image 112 is more transformed than the corresponding region of the template image 113 or if noise is superposed on the input image 112, the degree of matching between the input image 112 and the template 113 may not be so high even if the input image 112 includes the object image. To cope with this shortcoming, it is necessary to lower the threshold value T to be used for the determination of the step 104'. In this case, the determination in the step 104' does not reach the sufficient level.

On the other hand, in the step 104 of the first embodiment, the determination is executed on the transformation-allowable matching degree between the template image 113 and the input image 114 transformed to be fitted to the region of the object to be checked. In the arrangement of the first embodiment, the transformation-allowable matching degree is higher if the input image 112 corresponds to the image of the object to be checked, while it is lower if the input image 112 does not correspond to the image thereof. Hence, to identify them from each other, the threshold value T may be properly set. This thus makes it possible to detect the object to be checked with high accuracy. Hence, if the input image 112 is an image of an object that is not included on the basic template image 111, it is possible to identify the image. As a result, the system makes it possible to report an abnormal condition to an operator and to eliminate an unnecessary checking process 306, thereby being able to enhance the efficiency of the checking operation.

As described above, the first embodiment is far different from the prior art in that the flow of process is controlled on the transformation-allowable matching degree (that is, the degree of matching of the transformed input image 113 to the template image) being different from the degree of matching obtained in the matching process of the step 101 (that is, the degree of matching of the input image 112).

(1.4) Details of Process of Step 102

FIG. 5 is a flowchart showing the content of process of the step 102 in detail. Hereafter, the process of the step 102 will be described in detail with reference to FIG. 5.

Steps 501 to 503: The distance map creating unit 21 determines the second distance map 801 for keeping the distance from the boundary of the object region of the template image 113 at each pixel of the template image 113.

In the step 501, to create the binary map, the template image 113 is binarized. In the template image 113, it is presumed that the region on which an object to be checked is imaged indicates a higher pixel value than the background around the region. On the binary map, therefore, it is to be determined that the region with a value of 1 corresponds to an object region 120 and the region with a value of 0 corresponds to a region with no object 121. The binarizing process is executed by obtaining a maximum value and a minimum value of each pixel value of the template image 113 and defining a middle value between the maximum value and the minimum one as a binarizing threshold value.

Figures 6A, 6B:
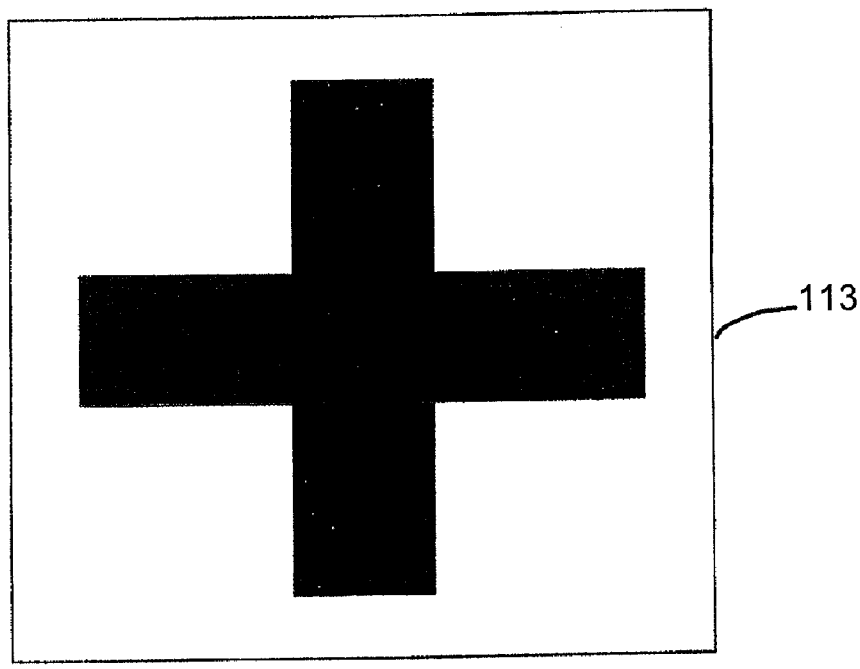
FIGS. 6A and 6B are model views showing a template image 113 and a binary map 601.

FIGS. 6A and 6B exemplarily shows the template image 113 and the binary map 601 respectively.

In the step 502, a first distance map 701 is created from the binary map 601. The first distance map 701 represents a distance between a boundary between 0 and 1 in the binary map 601 and each pixel. (This distance will be referred to as the "boundary distance".) For example, as to the pixels staying within the object region 120, that is, the pixels with a value of 1 on the binary map, the shortest distance from that pixel to the pixel with a value of 0 is the boundary distance of that pixel. Further, as to the pixels staying within the region with no object 121, that is, the pixels with a value of 0 on the binary map 601, the shortest distance from that pixel to the pixel with a value of 1 is the boundary distance of that pixel.

Moreover, in the first embodiment, the boundary distance is measured on the assumption that the distance to each of the adjacent four neighbors is the distance 1. Instead, the distance to each of the eight neighbors may be distance 1. Further, in this embodiment, to identify the inside or the outside of the object region by the boundary distance, a positive sign is allocated to the pixels located within the object region 120 and a negative sign is allocated to the pixels located within the region with no object 121. Further, to lessen the data amount and the amount of processing, the boundary distance of 0 is allocated to the pixels with a predetermined boundary distance or longer in the region with no object 121.

Figures 7, 8:
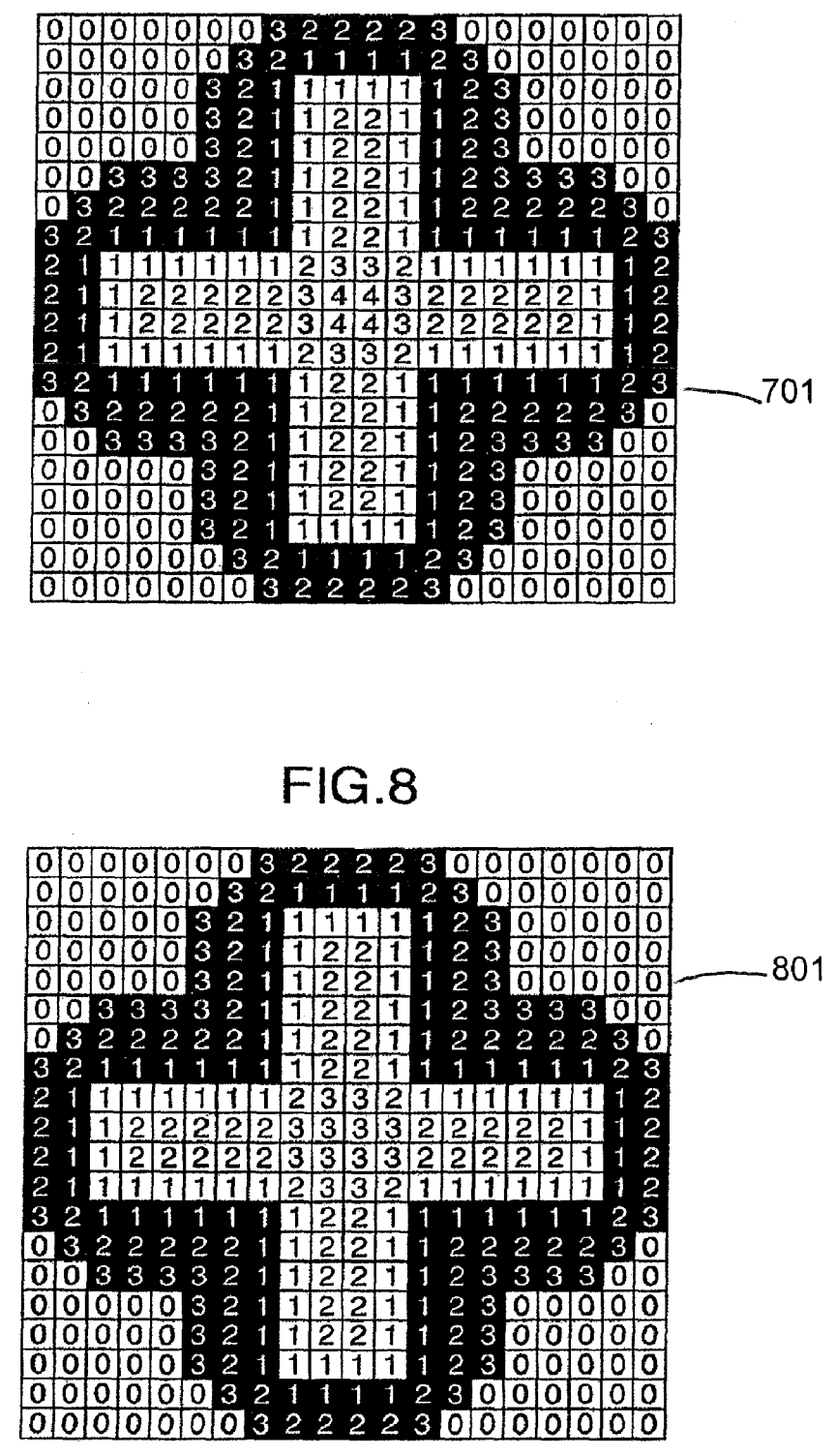

FIG. 7 exemplarily shows the first distance map 701. In this example, a boundary distance of 0 is allocated to the pixels with a boundary distance of 4 or more in the region with no object 121. Further, for the sake of description's convenience, instead of allocating a negative sign, to indicate a negative value, a numeric value is highlighted.

In the step 503, the second distance map 801 is created from the first distance map 701. The second distance map 801 is created by integrating a region being small in area (for example, a region of less than 10 pixels) of the continuous regions of the same boundary distance with the adjacent continuous regions of the same boundary distance in the sequence of the regions of a larger boundary distance in the first distance map 701 (that is, by replacing the boundary distance of each pixel of the small regions of the same boundary distance with the boundary distance of the adjacent continuous regions of the same distance.)

FIG. 8 is a model view showing the second distance map 801. In this example, since the continuous regions of the boundary distance 4 are small in area in the first distance map 701, those continuous regions are integrated with the adjacent continuous regions of the boundary distance 3.

Steps 504 to 505: The valley enhancing unit 22 performs the process of enhancing a valley on the change of the pixel values on the input image 112 and creates the valley-enhanced input image 115.

In the step 504, a negative edge enhancement is carried out on the input image 112 at a predetermined intensity. Concretely, the input image 112 is smoothed by taking an average of the adjacent pixels, for example. Then, by subtracting the smoothed image from the input image 112, the edge image is created. Next, a negative edge image is created by modifying positive pixel values into zero (0) and leaving only the negative pixel values on the edge image. Then, a negative edge enhanced image is created by multiplying a predetermined intensity (positive value) by each pixel value of the negative edge image. Last, the negative edge enhanced input image is created by adding the negative edge enhanced image to the input image 112.

Next, in the step 505, the level conversion of the pixel value is carried out with respect to the negative edge enhanced input image so as to create the valley enhanced input image 115. Concretely, this process includes the steps of taking a general average of the pixel values of the negative edge enhanced input image, taking the average (lower average) of the pixel values about the pixels of the lower pixel values than the general average value, taking the average (upper average) of the pixel values about the pixels of the upper pixel values than the general average value, and linearly converting the pixel value of each pixel so that the lower average is made to be −1 and the upper average is made to be 1. In this process, if the linearly averaged pixel value is smaller than −1, it is modified into −1 and if it is larger than 1, it is modified into 1. The process of the step 505 is represented by the following expression:

$$Y = -1 + 2x(x-a)/(b-a)$$

where x denotes a pixel value of the negative edge enhanced input image, y denotes a pixel value of the valley enhanced input image 155, a denotes a lower average, and b denotes an upper average.

Since the change (valley) of the pixel values between the object to be checked and the background and between noises and the background is relatively large, the values of the pixels located in such a valley are converted into a value of −1 by the process of the steps 505 to 506. On the other hand, since the change (valley) of the pixel values located within the region of the object to be checked or the like is relatively small, the pixel values of the pixels located in such a valley are not converted into −1. That is, the valley enhanced input image 115 has a more clear boundary between the object and the background is made more clear, that is, regional form of the object or the noise than the input image 112. By executing this pre-process with respect to the input image 115, in the shaping process after the step 505, if the region of the object to be checked exists in the valley enhanced input image 115, this region is more likely to be processed as a region matched to the form of the object region 120 of the template image 113, and if a noise region exists in the valley enhanced input image 115, the noise region is more likely to be processed as a region mismatched to the form of the object region 120 of the template image 113.

In addition, the process of the steps 504 to 505 may be executed in advance of or in parallel to the process of the steps 501 to 503.

Steps 506 to 507: The object corresponding region processing unit 23 shapes the non-background region (region whose pixel values are not zero (0)) to the form of the object region 120 on the region corresponding with the object region 120 of the valley enhanced input image 115 (the region overlapped with the object region 120 if the template image 113 is overlapped with the input image 115, which will be referred as to the "object corresponding region"). As a result, the shaped input image 116 is created.

In order to execute this process, the object corresponding region processing unit 23 includes a first unit 25 for executing a minimum replacement and a second unit 26 for executing a maximum replacement.

In the step 506, the first unit 25 repeats the minimum replacement a predetermined number of times (for example, three to five times) with respect to the valley enhanced input image 115.

The minimum replacement is a process of allocating a boundary distance to each pixel of the object corresponding region of the valley enhanced input image 115 by referring to the second distance map 801 and replacing the pixel values of the pixels to which the boundary distance is allocated with the minimum pixel value of the pixels of the same boundary distance allocated thereto, located in a predetermined range (for example, 8 neighbors) of those distance-allocated pixels. As to the region of the valley enhanced input image 115 that does not correspond with the object region 120 (meaning the region not overlapped with the corresponding object region 120 if the template image 113 is overlapped with the input image, the region being referred as to the "object non-corresponding region"), each pixel value is kept intact.

The ordinary smoothing process is executed to obtain an average or a middle value by referring to the pixel values of the pixels located in an isotropic range around target pixels and replacing the pixel values of the target pixels with the obtained average or middle value. However, if the ordinary smoothing process is applied to the valley enhanced input image 115, though the noise may be removed by the smoothing, since the referencing range is isotropic, the form of the object region 120 is not considered in that replacement. As a result, the information about the form of the object region 120 included in the valley enhanced input image 115 is attenuated. That is, the ordinary smoothing process is not necessarily served to match the object corresponding region of the valley enhanced input image 115 to the object region 120.

On the other hand, the minimum replacement is executed to refer to not the pixels located in the isotropic range but the pixels of the same boundary distance and to replace the pixel values so that the non-background region may be diminished. The set of the pixels of the same boundary distance includes the information about the form of the object region 120, for example, if the object region 120 is slender, the pixel set is slender. Hence, in the object corresponding region, the minimum replacement is served to make the pixel values of the pixels not matched to the form of the object region 120 (that is, the pixels surrounded by the pixels of the same boundary distance and low pixel values) lower and closer to the pixel value of the background, while the minimum replacement is served to make the pixels matched to the form of the object region (the pixels surrounded by the pixels of the same boundary distance and high pixel values) higher and left as a non-background part.

Figure 9A:
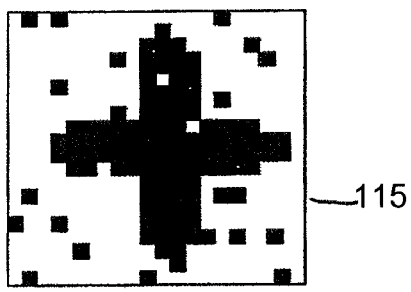
FIGS. 9A to 9H are model views showing the results processed by a minimum replacing process.
Figure 9E:
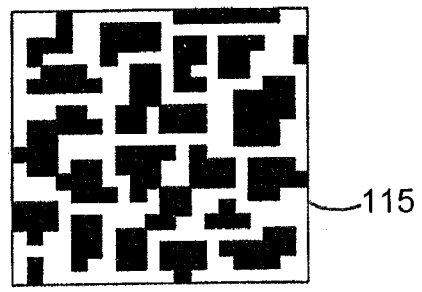
Figure 9B:
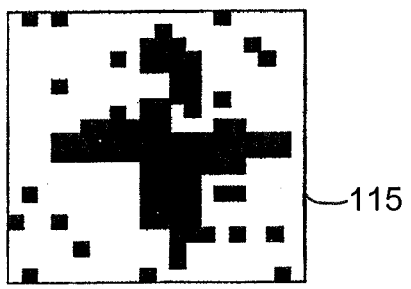
Figure 9F:
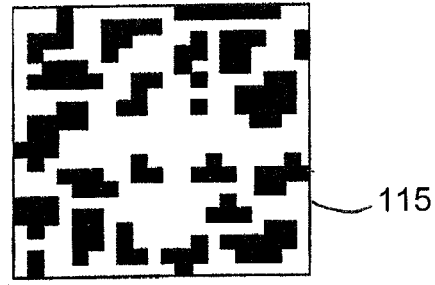
Figure 9C:
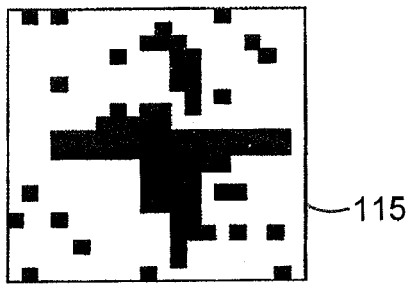
Figure 9G:
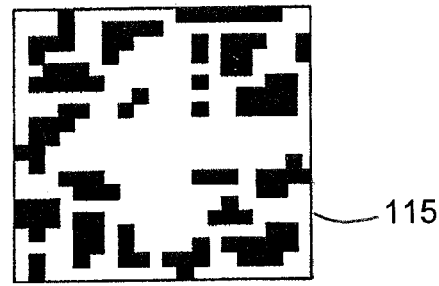
Figure 9D:
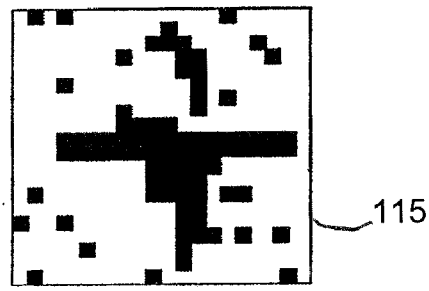
Figure 9H:
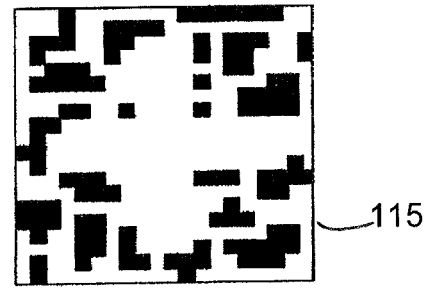

FIGS. 9A to 9H exemplarily show the results processed by the minimum replacement. FIG. 9A shows the valley enhanced input image 115 on which an object to be checked is shown (where the object is shifted or transformed). FIG. 9E shows the valley enhanced input image 115 on which no object is shown (noise is shown). FIGS. 9B to 9D show the results given by executing the minimum replacement with respect to the valley enhanced input image 115 shown in FIG. 9A by referring to the second distance map 801 shown in FIG. 8 once to three times. FIGS. 9F to 9H show the results given by executing the minimum replacement similarly.

In the first embodiment, the minimum replacement is executed by referring to the second distance map 801. Instead, however, the minimum replacement may be executed by referring to the first distance map 701 without executing the process of the step 503 (that is, creating the second distance map 801).

In the step 507, to create the shaped input image 116, the second unit 26 repeats the maximum replacement with respect to the valley enhanced input image 115 processed in the step 506 (obtained after the minimum replacement is repeated) a predetermined number of times (for example, three to five times).

The maximum replacement is a process of allocating a boundary distance to each pixel of the valley enhanced input image 115 processed by the first unit 25 by referring to the second distance map 801 and replacing the pixel values of the target pixels having the allocated boundary distances that are more than or equal to 1 (that is, each pixel located within the object corresponding region) with the maximum pixel value of the pixels being located in a predetermined range with the target pixels as a center and having the allocated boundary distances that are more than or equal to 1 of the pixels (that is, the surrounding pixels located within the object corresponding region). As to each pixel of the object non-corresponding region of the valley enhanced input image 115, the pixel value is kept intact.

In the first embodiment, the maximum replacement is executed by referring to the second distance map 801. Instead, the process of that step may be rearranged so as to determine the inside or the outside of the object corresponding region by referring to the binary map 601 and the first distance map 701.

FIG. 10 exemplarily shows the result obtained by the maximum replacement. FIGS. 10A to 10C show the results obtained by executing the maximum replacement with respect to the valley enhanced input image 115 of FIG. 9D by referring to the second distance 801 of FIG. 8 once to three times. FIGS. 10D to 10F show the results obtained by executing the maximum replacement similarly.

As shown in FIGS. 10A to 10F, the maximum replacement is served to bury the background region on the object corresponding region of the valley enhanced input image 115 and thereby increasing the non-background region, that is, enhancing the matching between the non-background region and the object region 120 in the object corresponding region.

As described above, in the object corresponding region of the valley enhanced input image 115, the execution of the minimum replacement and the maximum replacement results in transforming the non-background region to the object region 120.

Steps 508 to 509: The object non-corresponding region processing unit 24 obtains the non-background region (oozed region) 124 contacting with the object corresponding region in the object non-corresponding region of the shaped input image 116. Then, the processing unit 24 arranges the oozed region 124 so that the region 124 has no substantial impact on the degree of matching computed in the step 103.

In the step 508, the process is executed to allocate the boundary distance to each pixel of the object non-corresponding region of the shaped input image 116 by referring to the second distance map 801 and extract as the pixels of the oozed region 124 the non-background pixels whose pixel value are not zero (0) of the pixels having the allocated boundary distances being equal to −1 (that is, the pixels contacting with the object corresponding region selected from the pixels of the object non-corresponding region).

Next, the process is executed to extract as the pixels of the oozed region 124 the pixels whose pixel values are not zero (0) and around which the oozed region 124 exists, those pixels being selected from the pixels having the allocated boundary distances being equal to −2. (The term "around which" means "in the eight neighbors of which", for example.)

Further, the process is executed to extract as the pixels of the oozed region 124 the pixels whose pixel values are not zero (0) and around which the oozed region 124 exists, those pixels being selected from the pixels having the allocated boundary distance being equal to −3.

The foregoing processes make it possible to extract as the oozed region 124 the continuously extending non-background region contacting with the object corresponding region in the object non-corresponding region.

In the first embodiment, the search of the oozed pixels is continued until their boundary distances reach 3 (that is, in the boundary distance range of −3 in the second distance map 801). In actual, the maximum value of the boundary distance in the search of the oozed pixels may be arranged according to the design. Further, also in the first embodiment, the second distance map 801 is referenced in the step 508. Instead, the process of the step 508 may be rearranged to refer to the first distance map 701 when the boundary distance is allocated to the pixel.

In the step 509, the process is executed to compute an average of the pixel values excepting the oozed region 124 extracted in the step 508 on the shaped input image 116. Then, to create the transformed input image 114, the pixel value of each pixel of the oozed region 124 of the shaped input image 116 is replaced with the calculated average value.

In order to obtain a transformation-allowable matching degree through the use of the normalized correlation, the foregoing process is executed to arrange the oozed region 124 of the transformed input image 114 so that the oozed region 124 has no substantial impact on the transformation-allowable matching degree. That is, on the transformed input image 114, the average of the overall image is made equal to the average of the oozed region 124. Though the normalized correlation process is executed to calculate a correlation value by subtracting the average of the overall image from the pixel value of each pixel, if the average of the overall image is subtracted from the average of the oozed region 124, the subtracted result is made zero. Hence, no substantial impact is given to the correlation value.

Figure 10A:
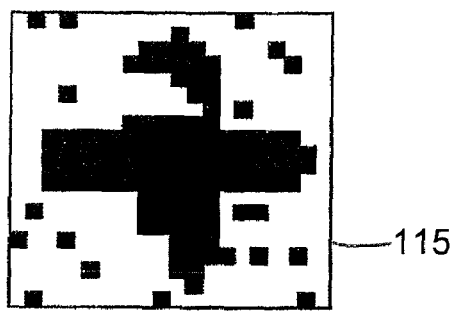
FIGS. 10A to 10F are model views showing the results processed by a maximum replacing process.
Figure 10D:
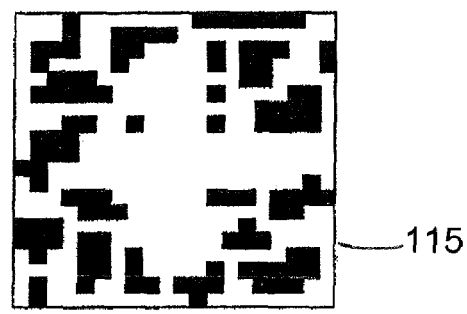
Figure 10B:
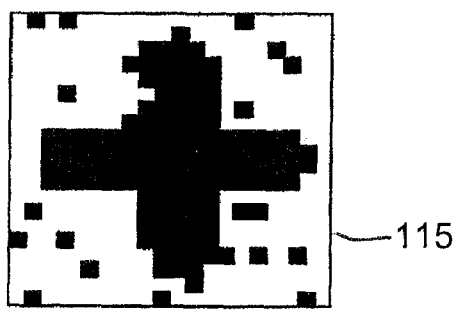
Figure 10E:
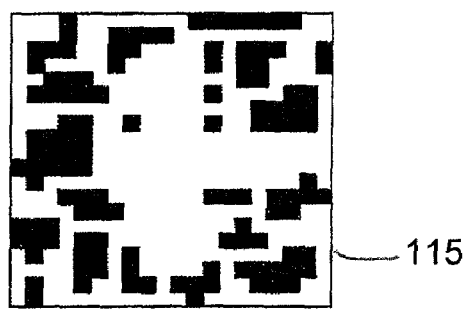
Figure 10C:
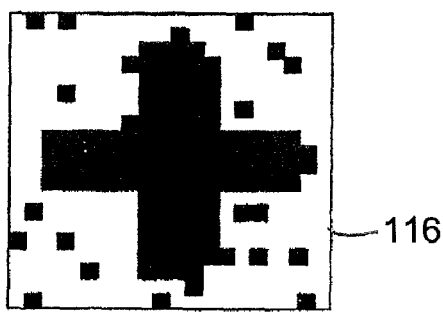
Figure 10F:
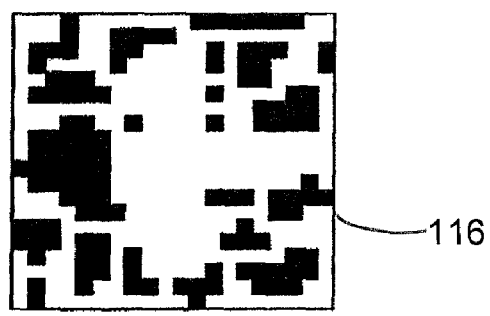
Figure 11A:
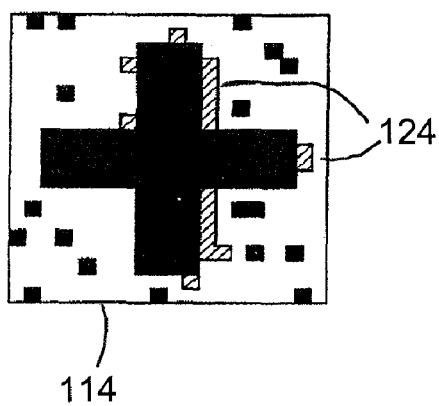
FIGS. 11A and 11B are model views showing a transformed input image 114.
Figure 11B:
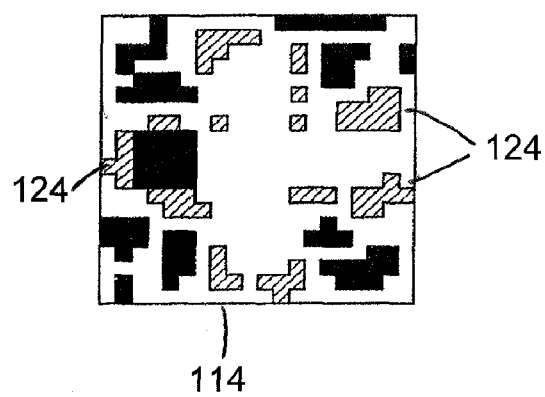

FIGS. 11A and 11B exemplarily show the transformed input image 114 created on the processed result shown in FIGS. 10C and 10F. In this example, the oozed region is shown by oblique lines. As will be understood from FIGS. 11A and 11B, the transformed input image 114 corresponding with the input image 112 on which the object to be checked is shown, as shown in FIG. 11A, is shaped so that the normalized correlation value with the template image 113 is made higher, while the transformed input image 114 corresponding with the input image 112 on which no object to be checked is shown, as shown in FIG. 11B, is shaped so that the normalized correlation value with the template image 113 is made lower.

As described above, in the first embodiment, the transformed input image 114 is created by shaping the non-background region to the form of the object region 120 in the object corresponding region of the valley enhanced input image 115 on which the boundary between the object and the background is made more clear and arranging the oozed region 124 in the object non-corresponding region of the valley enhanced input image 115 so that the oozed region 124 has no substantial impact on the transformation-allowed matching degree. Then, the transformation-allowed matching degree is calculated between the created input image 114 and the template image 113 and it is determined if the input image 112 corresponds with the image of the object to be checked on the matching degree. In this arrangement, the transformation-allowable matching degree between the transformed input image 114 and the template image 113 is mad higher if the input image 112 includes the image to be checked, while the matching degree is made lower if the input image 112 does not include the object to be checked. Hence, it is possible to properly set the threshold value T on which both are distinguished from each other. Based on the properly set threshold value T, the object to be checked can be detected with high accuracy.

(2) Second Embodiment

The arrangement of the second embodiment is shown in FIGS. 1A and 1B and FIGS. 2A and 2B and is the same as that of the first embodiment. The overall process is shown in FIG. 3 and is the same as that of the first embodiment except the content of the process of the step 102.

FIG. 12 is a flowchart showing the process of the step 102 in the second embodiment in detail. The processes of the steps 501 to 505 and 508 to 509 are the same as those of the step 102 of the first embodiment shown in FIG. 5. Hence, the description will be oriented to the process of the steps 1206 to 1027 that is a feature of the second embodiment.

In the step 1206, the first unit 25 repeats the modified minimum replacement a predetermined number of times (for example, three to five times) with respect to the valley enhanced input image 115.

The modified minimum replacement is a process of allocating a boundary distance to each pixel of the valley enhanced input image 115 by referring to the second distance map 801 and replacing the pixel values of the target pixels having the allocated boundary distances that are more than or equal to a predetermined value (for example, −1) with the minimum pixel value of the surrounding pixels having the allocated boundary distances that are equal to those of the target pixels, the surrounding pixels being located in a predetermined range (for example, eight neighbors) with the target pixels as a center. As to the object corresponding region of the valley enhanced input image 115, the pixel value of each pixel is kept. This modified minimum replacement is executed on the assumption that the region neighboring the object corresponding region corresponds with the object region 120.

In the step 1207, the second unit 26 creates the shaped input image 116 by repeating the modified maximum replacement with the valley enhanced input image 115 processed in the step 1206 (repetitively processed by the modified maximum replacement) a predetermined number of times (for example, three to five times).

The modified maximum replacement is a process of allocating a boundary distance to each pixel of the valley enhanced input image 115 processed by the first unit 25 by referring to the second distance map 801 and replacing the pixel values of the target pixels having the allocated boundary distances that are more than or equal to a predetermined value (for example, −1) with the maximum pixel value of the surrounding pixels having the allocated boundary distances that are more than or equal to the predetermined value, the surrounding pixels being located in a predetermined range with the target pixels as a center. As to the object non-corresponding region of the valley enhanced input image 115, the pixel value of each pixel is kept intact. The modified maximum replacement is executed on the assumption that not only the object corresponding region but the region neighboring the region correspond with the object region 120.

As described above, in the second embodiment, the shaping process is executed on the assumption that the object corresponding region and its neighboring region correspond with the object region 120. Hence, if the object to be checked appearing on the valley enhanced input image 115 is somewhat shifted from the object region 120 of the template image 112, the proper shaping process is made possible. Further, in the first embodiment, prior to the execution of the process of the step 102, by growing the object region 120 of the template image, the similar result to the second embodiment can be obtained.

Transformed Embodiment

The present invention is not limited to the foregoing embodiments and may be embodied in variations.

For example, though the foregoing embodiments indicate that the basic template image is larger than the input image, the present invention may be applied to the case that the basic input image is larger than the template image.

In this case, in the step 304 shown in FIG. 3, the computer 206 creates the basic template image 113 by executing a smoothing process as a pre-process to the matching operation with the designated image.

Then, in the step 305, the computer 206 creates the basic input image 112' by executing the smoothing process as a pre-process to the matching operation with the image taken in the step 303.

Next, in the step 101, the template matching process is executed to select the most matched portion to the template 113 of the basic input image 112' and extract the partial image of the selected portion of the basic input image 112' as the input image 112. The extracting process is the same as that of the foregoing embodiments.

Further, the foregoing embodiments are arranged so that the transformed input image 116 is created on the valley enhanced input image 115. If the boundary between the object to be checked and the background is clear on the input image 112, the transformed input image 116 may be created on the input image 112.

Further, the forgoing embodiments are arranged so that the basic template image 111 is created by executing the smoothing process with respect to the designed image and the input image 112 is created by executing the smoothing process with respect to the image taken by an imaging device and the input image 112 is created by executing the smoothing process with respect to the image taken by an imaging unit. Instead, if the object to be checked in the basic template image 111 is roughly as large as the object that is assumed to appear on the input image 112, the smoothing process may be left off.

Also, the foregoing embodiments are arranged so that the template image 113 is created on the designed image. Instead, the computer-designed image of the object to be checked may be used as the template image 113.

Moreover, in the foregoing embodiments, when creating the distance map 701, the boundary distance is measured on the assumption that the adjacent four neighboring pixels are a distance 1. Instead, two or three pixels may be a distance 1.

Moreover, in the foregoing embodiments, the minimum replacement and the maximum replacement are used for shaping the non-background region to the form of the object region. Instead of these replacements, it is possible to adopt a process of leaving the non-background region formed similarly with the region the pixels of which have the same boundary distance and diminishing the non-background region formed differently therefrom.

Lastly, the present invention may be applied to a technical field of deriving a degree of matching between images and is especially effective in computing a degree of matching between an image simulating a designed image or an object to be checked and an image taken by an imaging device.

While we have shown and described several embodiments in accordance with out invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

The invention claimed is:

1. A degree of matching computing apparatus for comparing an input image and a template image, and computing a degree of matching between the input image and the template image based on the compared result, comprising:

a transforming unit configured to transform the input image in a manner so as to be matched to a template object region corresponding to an object region of the template image; and a computing unit configured to compute a degree of matching between the transformed input image and the template image;

wherein the transforming unit includes:

an object corresponding region processing unit configured to shape a non-background region to the form of the template object region in an object corresponding region of the input image that corresponds with the template object region, wherein the object corresponding region processing unit includes:

a unit configured to allocate distance information to a target pixel of the object corresponding region of the input image by referring to the distance information, and to replace a pixel value of the target pixel with a pixel value of a target pixel located in a predetermined range and having an allocated distance equal to that of the target pixel, an object non-corresponding region processing unit configured to arrange an oozed region corresponding with a non-background region contacting with the template object corresponding region in an object non-corresponding region of the input image that does not correspond with the template object region so that the oozed region has no substantial impact on the degree of matching, and a unit configured to create distance information used to store distance information indicating a distance between a pixel of the template image and a boundary of the template object region, thereby acting as pre-processing unit to the object corresponding region processing unit, used to execute the shaping.

2. The degree of matching computing apparatus as claimed in claim 1, wherein the transforming unit provides a unit configured to enhance a valley on the change of pixel values of the input image, thereby acting as a pre-processing unit to the object corresponding region processing unit and the object non-corresponding region processing unit.

3. The degree of matching computing apparatus as claimed in claim 1, wherein the object corresponding region processing unit further includes:

a unit configured to replace a pixel value of each target pixel of the object corresponding region of the input image processed by the first unit with the maximum pixel value of the pixels located in a predetermined range with the target pixels as a center and within the object corresponding region.

4. The degree of matching computing apparatus as claimed in claim 3, wherein the first unit is served to allocate the distance to each pixel of the object non-corresponding region of the input image by referring to the distance map and to replace each pixel value of the target pixels having the allocated distances that are equal to or less than a threshold value X with the minimum pixel value of the pixels located in a predetermined range with the target pixels as a center and having the allocated distances that are equal to those of the target pixels, and wherein the second unit is served to replace each pixel value of the pixels located on the object non-corresponding region of the input image, and having the allocated distances equal to or less than the threshold value X with the maximum pixel value of the pixels located in a predetermined range with the target pixels as a center, and having the allocated distances equal to or less than the threshold value X.

5. The degree of matching computing apparatus as claimed in claim 1,
wherein the object non-corresponding region processing unit is served to take an average of the pixel values on the region outside the oozed region of the input image and replace the pixel value of each pixel of the oozed region with the average.

6. The degree of matching computing apparatus as claimed in claim 1, further comprising:
a unit configured to perform a template matching process of selecting the most matched portion to the input image from the basic template image larger than the input image and extracting the partial image of the selected portion of the basic template image as the template image.

7. The degree of matching computing apparatus as claimed in claim 1, further comprising:
a unit configured to perform a template matching process of selecting the most matched portion to the template image from the basic input image larger than the template image and extracting the partial image of the selected portion of the basic input image as the input image.

8. The degree of matching computing apparatus as claimed in claim 1, wherein the template image is created by using a designed image created on designing data to be to manufacture an object to be checked.

9. The degree of matching computing apparatus as claimed in claim 1, wherein the input image and/or the template image is an image smoothed at a pre-processing stage.

10. A checking system comprising:
the degree of matching computing apparatus as claimed in claim 1;
a determining unit configured to determine that an input image corresponds to an object image if the degree of matching obtained by the degree of matching computing apparatus is more than or equal to a predetermined threshold value or the input image does not correspond to the object image if the degree of matching is less than the predetermined threshold value; and
a checking device configured to check the input image if it is determined that the input image corresponds to the object image.

11. A method causing a computer to perform the process of:
transforming an input image so that the input image is matched to a template object region corresponding to an object region of a template image, the transforming process including:
an object corresponding region processing step of shaping a non-background region to a form of the template object region in the object corresponding region that is the region of the input image corresponding with the template object region, and the object corresponding region processing step, in order to shape the input image, including:
a step of allocating distance information to a target pixel of the object corresponding region of the input image by referring to the distance information, and replacing a pixel value of the target pixel with a pixel value of a target pixel located in a predetermined range and having an allocated distance equal to that of the target pixel, and an object non-corresponding region processing step of arranging an oozed region that is a non-background region contacting with a template object corresponding region so that the oozed region has no substantial impact on the degree of matching in the object non-corresponding region that is a region of the input image not corresponding with the template object region; and
computing a degree of matching between the transformed input image and the template image;
wherein the transforming process includes a step of creating distance information used to store distance information indicating a distance between a pixel of the template image and a boundary of the template object region, thereby acting as pre-process to the object corresponding region processing step, used to execute the shaping.

12. The method as claimed in claim 11, wherein the transforming process provides a step of enhancing a valley on the change of the pixel values of the input image as a pre-process to the object corresponding region processing step and the object non-corresponding region processing step.

13. The method as claimed in claim 11,
wherein the object corresponding region processing step, in order to shape the input image, further includes:
a step of replacing the pixel value of each target pixel of the object corresponding region of the input image processed in the first step with the maximum pixel value of the pixels located in a predetermined range with the target pixels as a center and within the object corresponding region.

14. The method as claimed in claim 13,
wherein the process of the first step is executed to allocate the distance to each target pixel of the object non-corresponding region of the input image by referring to the distance map and replace the pixel values of the target pixel having the allocated distances equal to or less than a threshold value X with the minimum pixel value of the pixels located with a predetermined range with the target pixels as a center and having the allocated distances equal to those of the target pixels, and
wherein the process of the second step is executed to replace the pixel values of the target pixels having the allocated distances equal to or less than the threshold value X, the target pixels belonging to the object non-corresponding region of the input image, with the maximum pixel value of the pixels located in a predetermined range with the target pixels with a center and having the allocated distances equal to or less than the threshold value X.

15. The method as claimed in claim 11, wherein the process of the object non-corresponding region processing step is executed to take an average of the pixel values of the region outside the oozed region of the input image and replace the pixel value of each pixel of the oozed region with the average.

16. The method as claimed in claim 11, causing the computer to perform the template matching process of selecting the most matched portion of the input image from the basic template image larger than the input image and the process of extracting the partial image of the selected portion of the basic template image as the template image.

17. The method as claimed in claim 11, causing the computer to perform the template matching process of selecting the most matched portion to the template image from the basic input image larger than the template image and the process of extracting the partial image of the selected portion of the basic input image as the input image.

18. The method as claimed in claim 11, causing the computer to perform the step of creating the template image by using the designed image created on the design data used to manufacture the object to be checked.

19. The method as claimed in claim 11, causing the computer to perform the step of smoothing the input image and/or the template image as a pre-process.

20. A method of comparing an input image with an object template image and computing a degree of matching between the input image and the object template image based on the compared result, comprising:

a transforming step of transforming the input image so that the input image is matched to the template object region corresponding to the object region of the template image; and a computing step of computing a degree of matching between the transformed input image and the template image, wherein the degree of matching is a normalized correlation value between the transformed input image and the template image;

wherein the transforming step includes:

an object corresponding region processing step of shaping a non-background region to the form of an object region in an object corresponding region of the input image that is a region corresponding with the template object region, and the object corresponding region processing step, in order to shape the input image, includes:

a step of allocating distance information to a target pixel of the object corresponding region of the input image by referring to the distance information, and replacing a pixel value of the target pixel with a pixel value of a target pixel located in a predetermined range and having an allocated distance equal to that of the target pixel; and an object non-corresponding region processing step of arranging an oozed region corresponding to the non-background region contacting with the object corresponding region so that the oozed region has no substantial impact on the degree of matching in an object non-corresponding region of the input image that is a region not corresponding with the template object region;

wherein the transforming process includes a step of creating distance information used to store distance information indicating a distance between a pixel of the template image and a boundary of the template object region, thereby acting as a pre-process to the object corresponding region processing step, used to execute the shaping.

21. The method as claimed in claim 20, wherein the object corresponding region processing step, in order to shape the input image, further includes:

a step of replacing the pixel value of each target pixel of the object corresponding region of the input image processed in the first step with the maximum pixel value of the pixels located in a predetermined range with the target pixels as a center and within the object corresponding region.

* * * * *